No. 882,932. PATENTED MAR. 24, 1908.
W. C. DOWNING.
NUMBERING MACHINE.
APPLICATION FILED APR. 1, 1907.

3 SHEETS—SHEET 1.

Witnesses:
Geo. P. Gaylord.
John Enders.

Inventor,
William C. Downing,
By L. B. Coupland,
Atty.

No. 882,932. PATENTED MAR. 24, 1908.
W. C. DOWNING.
NUMBERING MACHINE.
APPLICATION FILED APR. 1, 1907.

3 SHEETS—SHEET 2.

Witnesses:
Chas. E. Gaylord
John Enders

Inventor.
William C. Downing,
By L. B. Coupland,
Atty.

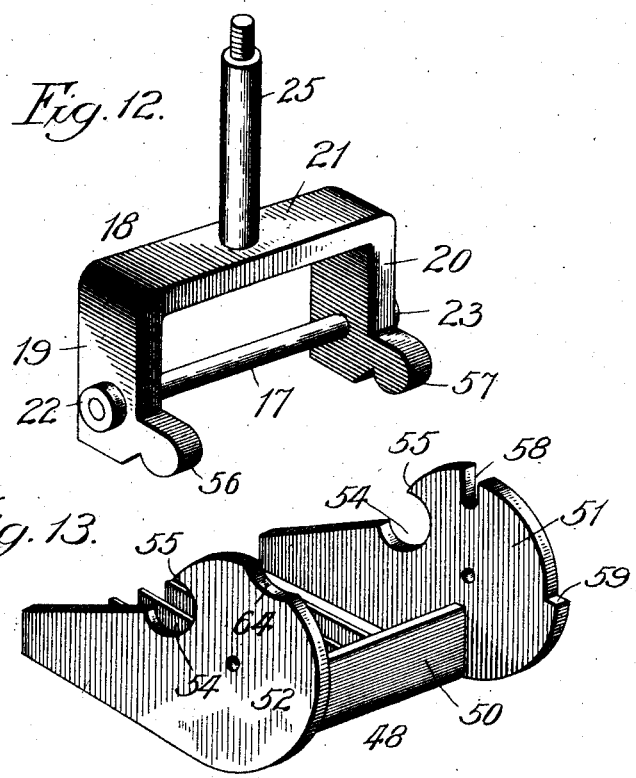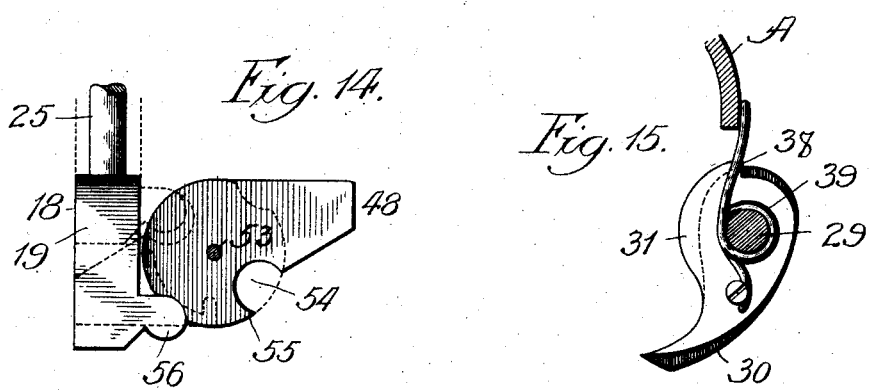

UNITED STATES PATENT OFFICE.

WILLIAM C. DOWNING, OF CHICAGO, ILLINOIS.

NUMBERING-MACHINE.

No. 882,932. Specification of Letters Patent. Patented March 24, 1908.

Application filed April 1, 1907. Serial No. 365,870.

*To all whom it may concern:*

Be it known that I, WILLIAM C. DOWNING, citizen of the United States, residing at Chicago, in the county of Cook and State of Illinois, have invented certain new and useful Improvements in a Numbering-Machine, of which the following is a specification.

This invention relates to numbering machines of the class set forth in my Letters Patent No. 829,260, August 21, 1906; and has for its object to provide the device therein set forth with a number of improved features as will be hereinafter set forth in detail.

Figure 1:
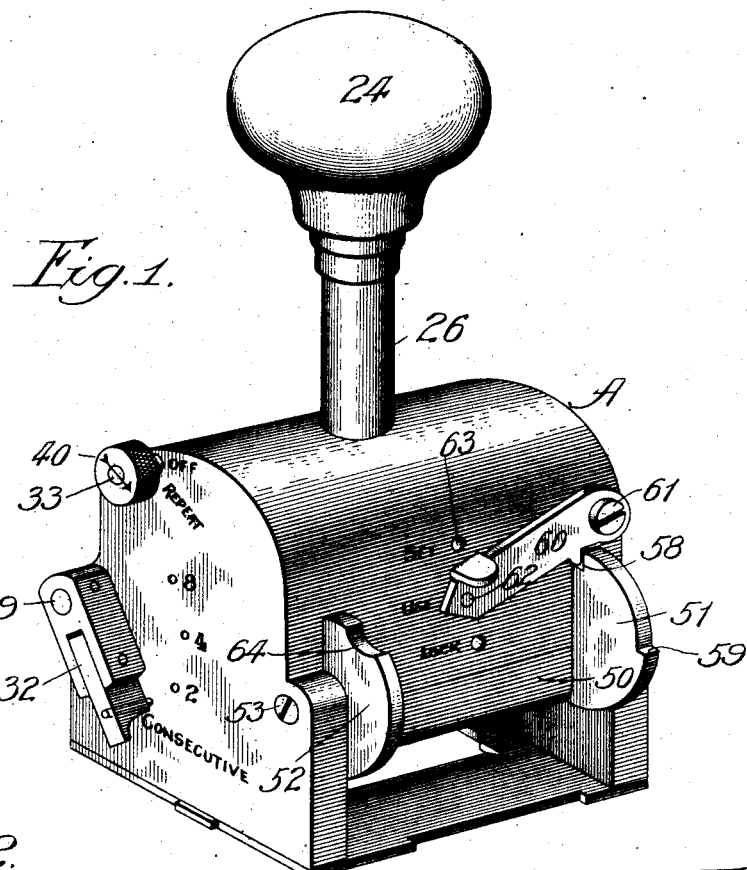
Figure 2:
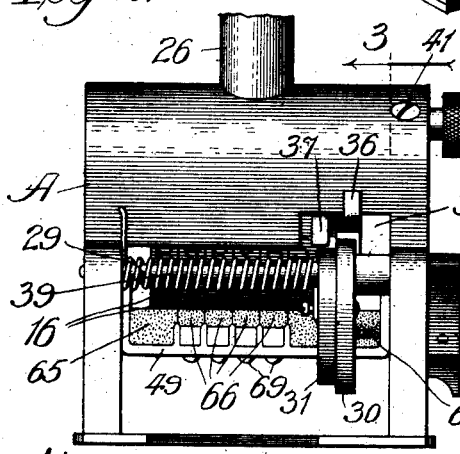
Figure 3:
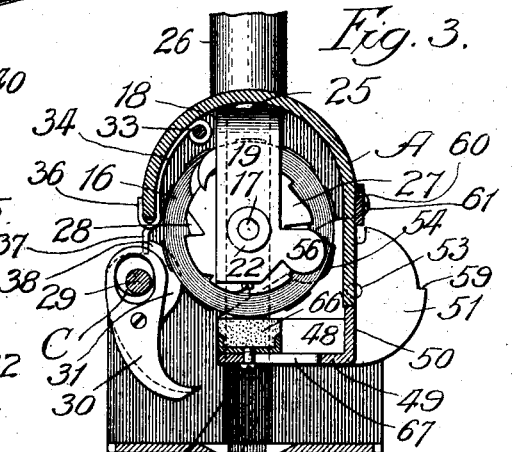
Figure 8:
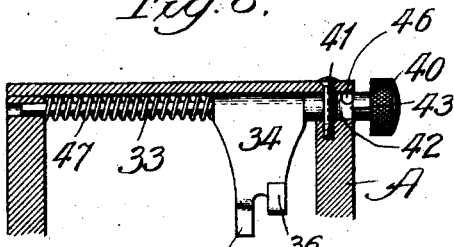
Figure 9:
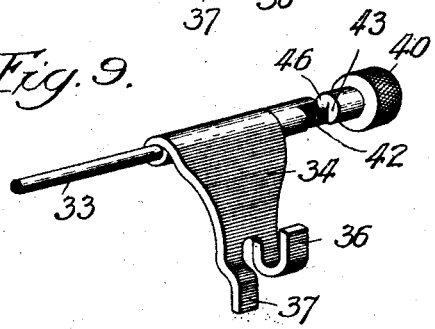
Figure 10:
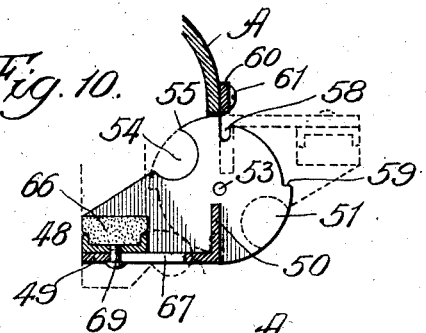
Figure 11:
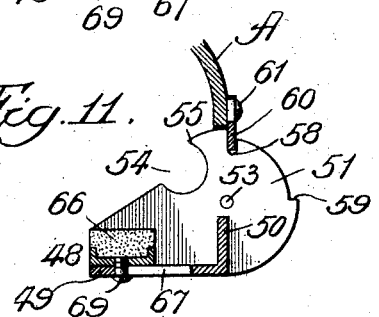

In the drawings, Figure 1 is a view in perspective looking at the rear side of the machine. Fig. 2 is a front elevation. Fig. 3 is a transverse section on line 3, Fig. 2. Figs. 4, 5, 6 and 7 are detached detail views of the different relative positions of the companion ratchet-wheels and actuating pawls. Figs. 8 and 9 are details of means for locking the actuating mechanism when the same number is to be repeated indefinitely. Figs. 10 and 11 are details of the means employed in controlling the action and position of the inking-pad. Fig. 12 is a view in perspective of the vertically moving frame carrying the printing mechanism. Fig. 13 is a view in perspective of the inking pad-holder. Fig. 14 is an end elevation of the frame and pad-holder in their assembled working position; and Fig. 15 is a detached view of the actuating pawls.

The principal parts set forth in the patent herein noted, will not be described in detail, reference being made only to such parts as coöperate with the improved features constituting the subject matter of this application.

A represents a casing inclosing and supporting the working mechanism. This casing will ordinarily be composed of metal and may be of any design or contour best adapted for the purpose.

The numbering disk-wheels 16, (Figs. 2 and 3) are loosely mounted on a non-rotatable axial shaft 17 the respective ends of which are rigidly secured in a reciprocating frame 18 consisting of the vertical end-bars 19 and 20 and the connecting bridge-part 21, forming an integral structure as best shown in Fig. 12. The ends of the shaft 17 project through the end bars of the frame and have friction-rollers 22 and 23 loosely mounted thereon. The respective ends of the casing are provided interiorly with a wide shallow recess D disposed vertically and in which the friction rollers seat and serve to ease the up and down movement of the frame-part in practical working. The down movement of the printing mechanism is effected by a pressure on the hand grasp 24, mounted on the upper end of a stem 25 inclosed in a sleeve or tube 26 and having its lower end fixed in the bridge-part of the frame 18, as best shown in Fig. 12. When the actuating pressure on the hand-grasp is relaxed the numbering disks are automatically returned to their highest or normal position by means of a spring coiled on said stem but not shown in this instance.

The governing ratchet-wheel 27 and the movement ratchet-wheel 28 are rotatably mounted on their axial shaft 17. A pawl or pivot shaft 29 has its respective ends journaled in the casing on the front side of the machine, a cam C being rigidly mounted on the shaft 29. The outer end of a pawl 30 is loosely connected with the cam C, the free end extending inward in position to engage the teeth in the governing ratchet-wheel. A pawl 31 has its pivotal end mounted on shaft 29, the free end being adapted to engage the teeth in the movement ratchet-wheel 28, all of which are of the same construction and have the same operation as in the patent herein referred to.

Figs. 4, 5, 6 and 7 are designed to illustrate the relative position of the pawls and the ratchet-wheels in the different operations. The governing ratchet-wheel has notches between the teeth of a variable depth, and the movement ratchet-wheel notches of a uniform depth.

Figure 4:
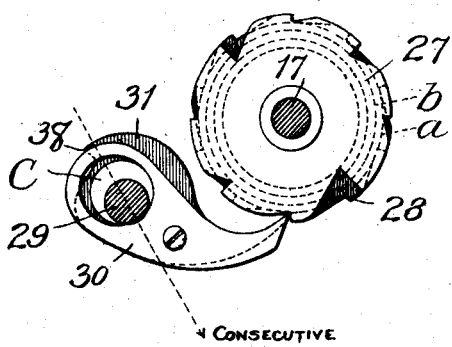
Figure 5:
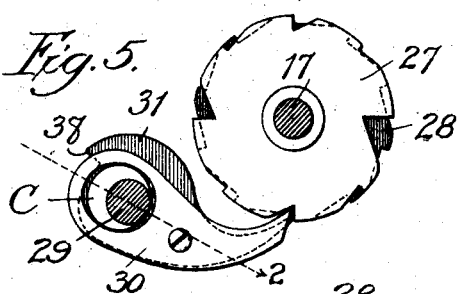
Figure 6:
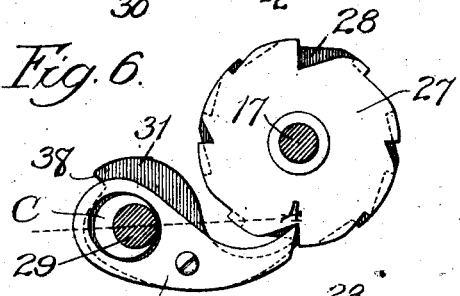
Figure 7:
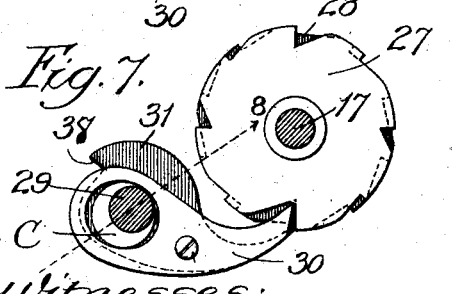

When the adjustable indicator-finger 32 is in the position shown in Fig. 1, the operation is consecutive and to which Fig. 4 corresponds. Moving the finger to engage aperture 2 is the duplicating position to which Fig. 5 corresponds. Moving the finger to aperture 4 indicates the quadruple position to which Fig. 6 corresponds. Moving the finger to engage apertures 8 indicates the octuple position to which Fig. 7 corresponds. The different engaged positions of the pawl 30 with the governing ratchet-wheel are indicated by dotted circular lines in Fig. 4, beginning with the outer line *a* indicating the consecutive position, the next line the duplicating position b and so on in regular order.

It will be understood that by the use of a ratchet-wheel having notches of different depths, the machine may be made to repeat a number of times with each position of the indicator finger 32, either by cutting deeper notches or by using two or more ratchet-wheels with a different number of teeth and notches between, as for example. Two ratchet-wheels, one having seven teeth and the other eight teeth with one deep notch in each wheel would repeat fifty six times and then automatically change to the next highest number. With two deep notches in the eight tooth wheel it would repeat twenty eight times, and with four deep notches the same number would be repeated fourteen times and then again automatically change to the next higher number.

One of the improved features provides a means for holding the pawls actuating the ratchet-wheels 27 and 28 out of engagement therefrom so that the same number may be repeated indefinitely, as will be next described.

A rod 33 is inserted through the upper part of the casing and is movably supported in the respective ends thereof, as best shown in Fig. 8. This rod has the upper end of a plate 34 mounted thereon, and has both an endwise and a turning movement. This plate is bifurcated at its lower end (Figs. 8 and 9) and extends downward close against the inside of the casing to an opening 35 therein as best shown in Fig. 2. One prong end of the plate extends outward through the opening 35 and is bent upward to form a hook-end 36 which lies close against the outer side of the casing and forms a retaining guide in providing for a slight lateral movement of the plate from one of its positions to the other. The other prong end 37 of the plate 34 extends downward in position to be moved into line with the movement pawl 31 and at the proper time engage a shoulder 38 formed thereon and hold the pawls out of engagement from their working position against the pressure of the spring 39. This disengagement of the pawls is effected by a proper manipulation of the rod 33, the object of which is to set the machine so that the ratchet-wheels and printing disks will remain stationary and permit of the same number being repeated indefinitely. By this arrangement the device may be converted from an automatic into a non-automatic machine, thereby obtaining the same result as that of the "lever machine" now in general use.

The outer part of rod 33 is somewhat enlarged and has a finger grasp 40 fixed on the projecting end thereof, as shown in Figs. 1, 2, 8 and 9. A pin 45 is rigidly fixed in the casing and seats in recess 42 between said shoulders. A groove 46 is also formed in rod 33 and in line with shoulder 43. A spring 47 is mounted on rod 33 between the opposite end of the casing and the plate 34.

When the finger-grasp 40 is in the position away from the casing as shown in Figs. 1, 2 and 8, the machine is set to repeat as indicated by the arrow (Fig. 1) pointing to the word "Repeat" indicated on the casing. In this position the prong end 37 of plate 34 is in engagement with the shoulder 38 of pawl 31 and holds both pawls down in the disengaged position shown in Fig. 3. The pressure of the spring 47 holds the repeating attachment in this position. By pressing the finger-grasp inward against the casing the prong 37 is moved laterally away out of engagement with shoulder 38. Then turn the finger-grasp toward the front of the machine which will bring the groove 46 in engagement with pin 45 and lock the repeating mechanism out of engagement. It will be understood that the numbering or printing mechanism must be in its lowermost position to back far enough to permit of the prong end 37 moving in back of the same and prevent the free ends of the pawls from following the up movement of the numbering mechanism. It will also be understood that the pawls 30 and 31 are then automatically returned to their normal engaged working position by the spring 39 on the pawl shaft.

The inking pad-holder 48 (Fig. 13) comprises a bottom-plate 49, a part 50 turned upward at right angles thereto and the flanged ends 51 and 52, the rounded portion of which project out through the casing at the rear side, as shown in Figs. 1, 3, 10 and 11. The holder is movably retained in place by pivot-pins 53 inserted through the casing from each end.

The end plates 51 and 52 are each provided with a notch 54 having an overhanging hook-edge 55. The frame end bars 19 and 20 corresponding to the "end-bars 18 and 19" of the patent herein referred to, are each provided adjacent to their lower ends with lugs 56 and 57 which are held in loose engagement with the deep notches 54 in the respective end parts 51 and 52. The inking parts are shown in their normal position in Figs. 3, 10.

The overhanging hook-edges 55 may be extended far enough over the lugs 56 to come to a bearing thereon at any point just short of the end bars 19 and 20, as will afford the best results in increasing the leverage and imparting a free up and down movement to the numbering mechanism.

When the numbering mechanism is moved downward the inking pad holder is also moved downward and then swung outward out of the way by means of the lugs 56 and 57 the contact of which returns the inking-pad-holder to its normal position.

The integral end plate 51 of the pad-holder is provided in its upper edge with a notch 58 and a stop shoulder 59, the metal being cut away between said notch and shoulder in forming the latter, as shown in Figs. 1, 3, 10, 11 and 13. One end of a movable latch 60 is pivoted to the casing as at 61. The opposite free end of this latch carries a pin 62 adapted to engage either one of a number of apertures 63 in retaining the same in any of the different positions to which the latch may be moved.

When the latch is in the middle position (Fig. 1) it is up out of engagement from the notch 58 and the pad-holder is free to move in its working position, the outward movement of the same being limited by the shoulder 59 coming to a stop against the latch 60. The pad-holder may be raised up to the high position shown in Fig. 14 and indicated by dotted lines in Fig. 10, and the same temporarily held in that position for the purpose of inking the pad, or in providing an opening affording convenient access to the printing disks when it is necessary to change the number by hand in resetting the machine to start at number one or any other number. The pad-holder is held in this highest out of the way position by the lug 56 engaging a shallow recess 64 formed in the end plate 52 of the holder. This recess 64 is shown in Figs. 1, 13 and when the holder is in its highest position the recess is in the engaged position corresponding to the position of the lug indicated in Figs. 10, 14. In this position the numbering disks rest at a point just above the bottom plate 49. A slight pressure on the operating stem will force the disks down to their lowermost position and disengage the lug from the shallow notch in the end plate when the pad-holder will be automatically returned to its working position.

By moving the latch down to its lower position it drops into notch 58 and locks the machine against use.

The inking pad is made up of a number of independent sections, the end sections 65 being stationary in the holder, while the intermediate sections 66 are movable, and correspond in width to that of the numbering disks, as shown in Fig. 2. The bottom part of the holder is provided with a number of slots 67 in line with and corresponding to the number of pad-sections. A fastening screw 68 is inserted up through each of said slots and engage the pad-sections and lock them in any position to which they are capable of being moved. The space in the bottom of the pad-holder is of sufficient width to permit of any of the pad-sections being moved back away from inking contact with its particular numbering disk. By this means any of the numbering disks, except the two end ones, may be cut out and the numbers thereon dropped in arranging for any desired combination of numerals as may be required in practical use.

Having thus described my invention, what I claim is—

1. In a numbering-machine, the actuating pawls, a movable rod, a plate suspended therefrom and having its lower end positioned to temporarily engage and hold said pawls stationary, and means for moving said plate into and out of engagement with reference to said pawls.

2. In a numbering-machine, the actuating pawls, a rod having both an endwise and a turning movement, a plate carried by said rod and having the lower end thereof stop in position to be in and away from engagement with said pawls for locking the same away from their operative connection and means for controlling the position of said plate.

3. In a numbering-machine, the actuating pawls, a movable rod having its respective ends supported in the inclosing casing, a plate suspended from said rod and having its lower free end bifurcated, one part extending outward and is then bent upward against the outside of said casing and the other part extending downward and held normally in a position to be temporarily moved into engagement with said pawls when disengaging the same from their working position, and means for holding said plate in its locking position.

4. In a numbering-machine, the actuating pawls, one of which has a shoulder formed thereon, a movable rod, a plate suspended therefrom and having the lower end bifurcated one part being turned upward in engagement with the casing, the other prong-part being positioned to be moved into engagement with said shoulder when disengaging said pawls from their operative connection, a spring mounted on said rod between the wall of the casing and said plate and imparting an endwise movement to said rod in bringing said prong into the path of said shoulder and means for locking said rod against an endwise movement and holding said prong free from engagement with said shoulder.

5. In a numbering machine, an inking pad-holder provided with notches in the respective flanged ends thereof which have overhanging hook edges, and the end-bars of the reciprocating frame-part provided with integral lugs loosely engaging said notches, said hook-edges having an overlapping bearing on said lugs.

6. In a numbering-machine, an inking-pad-holder having rounded flanged ends and a shallow recess formed in one of said flanges, and a vertically moving frame part provided on its respective end-bars with integral lugs, one of said lugs being positioned to engage said recess in locking said holder in its highest out of the way position.

7. In a numbering-machine, an inking pad-holder provided in its bottom part with a number of slots, an inking pad divided into a number of independent sections which are located in line with said slots and adapted to be moved away from and back to an inking position, and means for locking said sections at any point along the line of said slots.

8. In a numbering-machine, a pad-holder having slots formed in the bottom-part thereof, an inking-pad composed of a number of independent movable sections and means for locking said sections at any point along the line of said slots.

9. In a numbering-machine, a rocking pad-holder having rounded flanged ends, one of said ends being provided with a notch and a shoulder spaced apart, and a latch having a pivoted adjustment and adapted to be moved into position to engage said notch and lock the machine against working, or engage said shoulder in limiting the movement of said holder outwardly.

In testimony whereof I affix my signature, in presence of two witnesses.

WILLIAM C. DOWNING.

Witnesses:
  L. B. COUPLAND,
  G. E. CHURCH.